W. F. ROSSMAN.
Coffee Settler.
No. 47,460. Patented April 25, 1865.
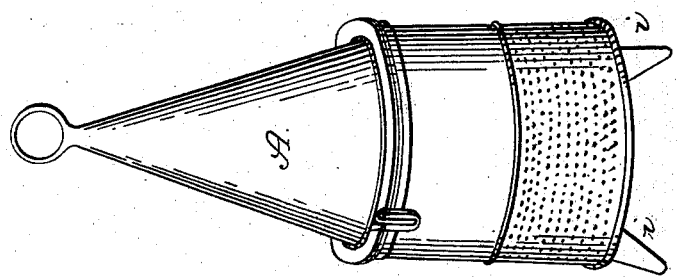
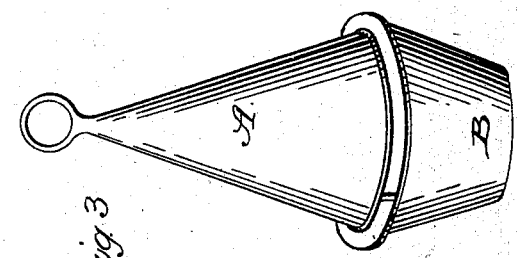
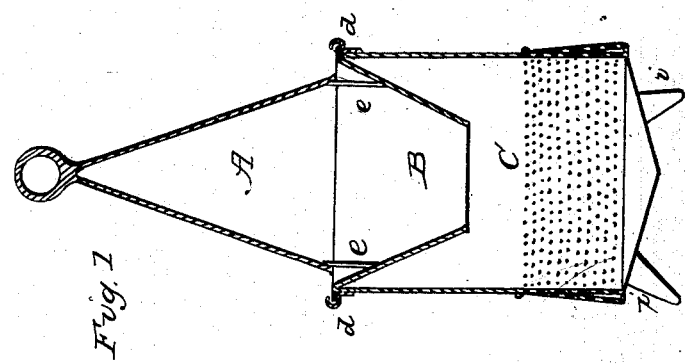

UNITED STATES PATENT OFFICE.

WILLIAM F. ROSSMAN, OF HUDSON, NEW YORK.

IMPROVEMENT IN COFFEE-SETTLERS.

Specification forming part of Letters Patent No. 47,460, dated April 25, 1865.

*To all whom it may concern:*

Be it known that I, WILLIAM F. ROSSMAN, of the city of Hudson, in the county of Columbia and State of New York, have invented a new and useful Instrument or Apparatus for Cleansing and Settling Coffee, which I call the "Magic Coffee-Settler"; and I do hereby declare that the following is a full, clear, and exact description of the construction and operation of the same, reference being had to the annexed drawings, making a part of this specification, in which—

Figure 1 is a vertical section thereof. Fig. 2 is a photographic perspective view of same. Fig. 3 is a perspective view of cone and funnel detached from cup.

The nature of my invention consists in constructing an instrument or apparatus which, when placed in a pot of boiling coffee where the grounds have been thrown loose in the water, will by producing an eddying current collect them perfectly, and thus clear and settle the coffee ready for use.

To enable others skilled in the art to make and use my invention, I will proceed to describe its construction and operation.

I construct my coffee-settler of tin, usually about six inches high, with cup three inches in diameter, for a gallon coffee-pot. They are to be made of a size proportionate to the quantity of coffee required. The top consists of a hollow cone, A, open at the base, having suspended beneath it a funnel, B. The top of the funnel B is enough larger than the base of cone A to admit the revolving current, with the coffee-grounds borne with it, into the funnel freely. This funnel B extends down about one-third of the depth of the cup C, and has a large open bottom. One half, (the lower half) of cup C is perforated to allow the fluid coffee to pass through freely, but not the grounds. This cup has what is termed a "pitched" or "concave" bottom, which prevents it from being disturbed by the boiling water, and also directs the current outward and to the sides of the cup. It is also provided with three legs, $i$ $i'$ $i''$, of sufficient length to clear it from the bottom of the coffee-pot. Two clasps or hooks, $d$ $d'$, one opposite the other, on top of the cup C, serve to keep the cone-top A and funnel B in place. A slight notch in the flange edge of the funnel admits it below the inner edges of catches $d$ $d'$, and by revolving it a very little either way the whole are locked together securely, and easily separated when desired. The funnel B is suspended from base of cone A by three supporting-wires, $e$ $e'$ $e''$. The cone is provided with a wire loop at top to handle it.

I do not claim the perforated C when used as a leacher or soaker, alone or in any other manner except as herein described, nor do I claim it when suspended at top of the coffee-pot and the boiling water strained or leached through the coffee in it, as in the French stripper, (so called.)

No part of my apparatus is secured or attached to the coffee-pot, as many are, thereby rendering it very difficult to keep clean, but is entirely distinct and separate from it, so far as relates to its construction. Its use is evident from what has been said. The coffee being thrown into the coffee-pot loose and the water poured onto it in the usual way of making this beverage, the "Magic Coffee-Settler" is placed inside before or at the time of boiling. As soon as ebullition begins, a vortex or eddying current is created around the "settler," and the coffee-grounds are carried with it into the space between the base of the cone A and funnel B, and thence down through the funnel into the perforated cup C, and while the cleared liquid passes through the perforations the grounds are trapped and retained in the cup. This process or operation being continued a few minutes renders the coffee perfectly clear and ready for use, thus saving the use of egg, isinglass, fish-skin, or any other article, ingredient, or compound, except the "Magic Coffee-Settler."

What I claim as my invention, and desire to secure by Letters Patent of the United States, is—

1. The hollow cone A, with open base, having funnel B attached, in combination with the perforated cup C, all constructed substantially in the manner and for the purpose set forth.

2. The open space between the base of cone A and top or upper margin of funnel B, as and for the purpose described.

WM. F. ROSSMAN.

Witnesses:
ISAAC N. COLLIER,
HIRAM W. DIXON.